W. W. DUNCAN & A. N. HOOD.
METHOD OF MAKING PNEUMATIC TIRES.
APPLICATION FILED AUG. 22, 1910.

1,016,918.

Patented Feb. 6.

Attest:
Ewd L. Toleon
Bert M. Hahl

Inventors:
William W. Duncan,
Arthur N. Hood,
by Spear Middleton Donaldson & Spear
Attys

UNITED STATES PATENT OFFICE.

WILLIAM W. DUNCAN, OF WATERTOWN, AND ARTHUR N. HOOD, OF NEWTON, MASSACHUSETTS, ASSIGNORS TO HOOD RUBBER COMPANY, OF BOSTON, MASSACHUSETTS.

METHOD OF MAKING PNEUMATIC TIRES.

1,016,918.  Specification of Letters Patent.  Patented Feb. 6, 1912.

Application filed August 22, 1910. Serial No. 578,341.

*To all whom it may concern:*

Be it known that we, WILLIAM W. DUNCAN and ARTHUR N. HOOD, citizens of the United States, residing at Watertown, Massachusetts, and Newton, Massachusetts, respectively, have invented certain new and useful Improvements in Methods of Making Pneumatic Tires, of which the following is a specification.

Our present invention relates to a method of making pneumatic tires, and includes the novel method of procedure hereinafter described and particularly defined in the appended claim.

Heretofore, so far as we are aware, the anti-skid pneumatic tires of the type in which the slipping is prevented by integral rubber projections, have been solely of the mold cured type, the projections being formed by having the interior of the mold suitably engraved or shaped to secure the desired configuration of tread surface on the tire.

According to our invention, we produce a tire having integral rubber non-skidding projections of any desired configuration without the necessity of an engraved mold.

In order to illustrate the manner of carrying out our invention, we have appended hereto an explanatory sheet of drawings, in which—

Figure 1:
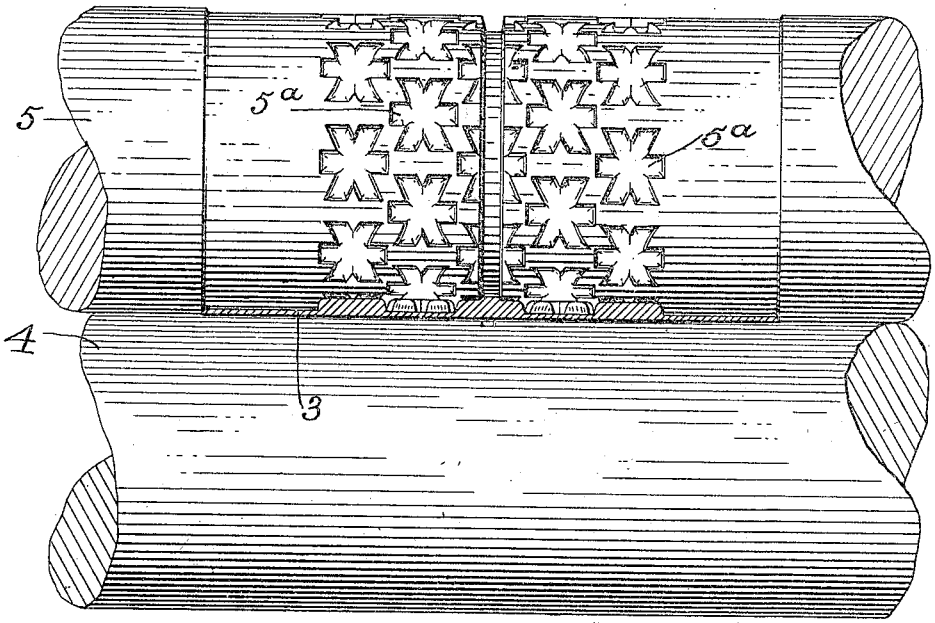
Figure 2:
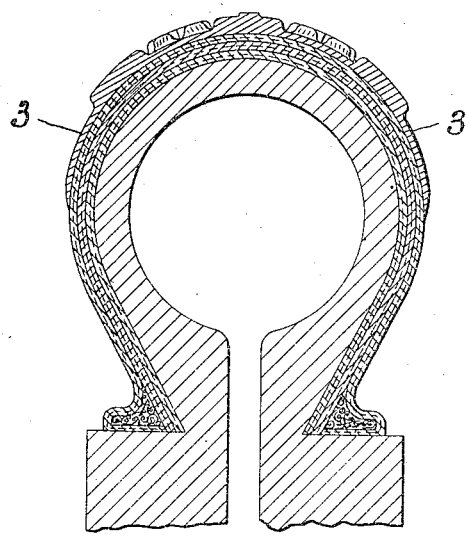

Figure 1 is a sectional elevation illustrating the manner of forming the tread surface, and Fig. 2 is a view illustrating the applying of the tread surface or strip to the body of the tire.

In forming our improved non-skid tire, we build up the body of the tire upon a ring formed in the usual manner. The tread strip 3 we form upon a rubber calender of ordinary form (two rolls only of which are shown in part at 4 and 5), having one of its rolls 5 engraved or embossed, as indicated at 5ª to give to one surface of the rubber strip produced by the calender a surface of suitable width having corrugations or projections. This uncured strip is then applied to the outer surface of the body of the tire, the ends being overlapped or joined by a bevel joint, after which the tire is put into an "open heat" to secure the proper vulcanization.

Having thus described our invention what we claim is:

The herein described method of manufacturing pneumatic tires which consists in forming a tire body of fabric and uncured rubber, separately rolling a strip or band of uncured rubber with an embossed surface, applying said strip or band to the periphery of said body, and thereafter subjecting the tire to the "open heat" vulcanizing treatment, substantially as described.

In testimony whereof, we affix our signatures in presence of two witnesses.

WILLIAM W. DUNCAN.
ARTHUR N. HOOD.

Witnesses:
FRANK D. BEANE,
ALFRED A. GLIDDEN.